Feb. 24, 1931. W. H. HINCKLEY 1,793,801
SELF CONTAINED POWER AND TRANSMISSION UNIT
Filed March 28, 1928 2 Sheets-Sheet 1
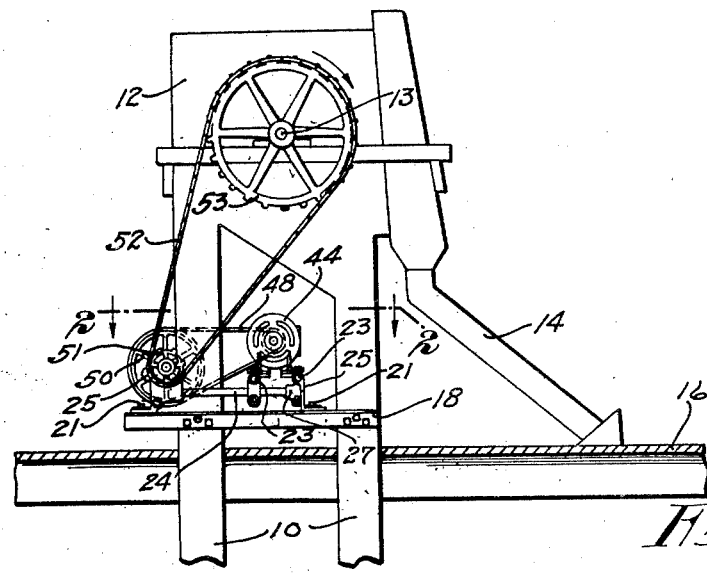
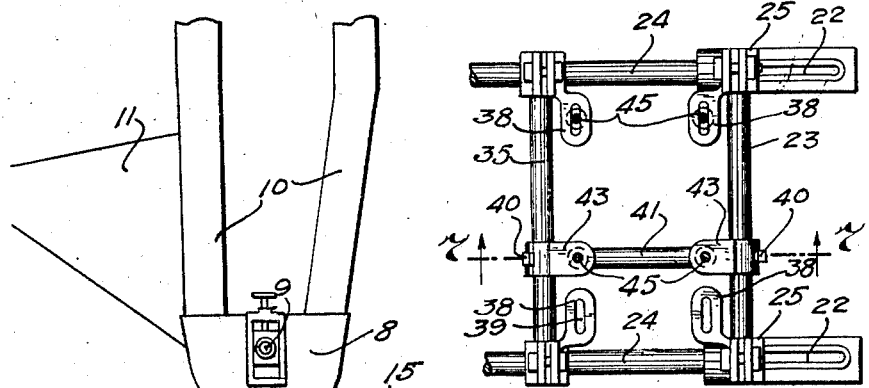
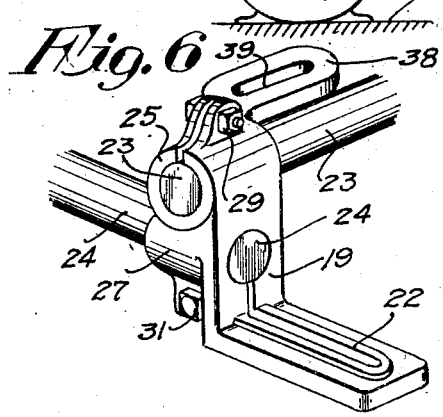
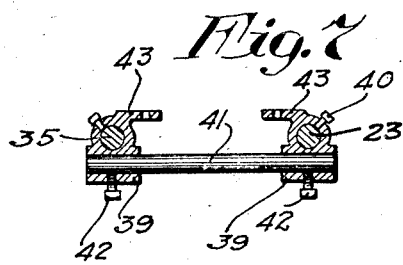
Inventor
Willard H. Hinckley
By his Attorneys Feb. 24, 1931.  W. H. HINCKLEY  1,793,801

SELF CONTAINED POWER AND TRANSMISSION UNIT

Filed March 28, 1928  2 Sheets-Sheet 2

Inventor
Willard H. Hinckley
By his Attorneys
Merchant and Kilgore

Patented Feb. 24, 1931

1,793,801

UNITED STATES PATENT OFFICE

WILLARD H. HINCKLEY, OF ST. PAUL, MINNESOTA, ASSIGNOR TO GILMORE-McARDLE CO., OF MINNEAPOLIS, MINNESOTA, A CORPORATION OF MINNESOTA

SELF-CONTAINED POWER AND TRANSMISSION UNIT

Application filed March 28, 1928. Serial No. 265,465.

My invention has for its object to provide a self-contained power and transmission unit that is universally adjustable to permit the same to be attached to any convenient support in a building, such as stringers or posts. Said invention further provides such a unit that can be packed and shipped disassembled to facilitate the handling of the same. The invention also permits the several parts of the disassembled unit to be easily carried to the place said unit is to be installed and especially to such places that are inaccessible and difficult to work in and handle bulky objects.

While the invention is intended for general use, it is especially well adapted for use in grain elevators for driving either the boot shaft or the head shaft. It is well known in country elevator constructions that the house moves considerably under the varying load of grain carried therein and that the elevator proper is mounted independently of the house so that the same is not effected by the movement thereof. In this elevator structure, when the driving mechanism for the elevator is mounted in part on the house and in part on the elevator proper it is impossible to keep the same properly aligned and adjusted in view of the varying movements of the house in respect to said elevator. My self-contained unit is especially well adapted to be secured to the legging of an elevator at any desired elevation and in such a manner that either the boot shaft or the head shaft may be driven therefrom at either side of said legging.

Said unit is so designed as to support the motor thereof between the legs of the elevator where the same is out of the way and also equalizes the load so that the same is evenly distributed on the two legs of the elevator. By assembling the power and transmission mechanism in a self-contained unit makes it possible to use a silent chain drive from the motor to the transmission mechanism for the reason that the parts thereof are held in proper alignment, which, from an engineering standpoint, is highly desirable.

As the unit is mounted on the legging of the elevator its transmission mechanism always has a definite and positive relation to the shaft of the elevator which is operated thereby so that the driving connections are kept in proper alignment and relation to each other.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a view partly in side elevation and partly in section showing the invention embodied in a grain elevator;

Fig. 5 is a detail view partly in plan and partly in section taken on the line 5—5 of Fig. 3;

Fig. 6 is a fragmentary perspective view showing one of the front bearing brackets and connected shafts; and Fig. 7 is a view partly in side elevation and partly in section taken on the line 7—7 of Fig. 5.

Figure 2:
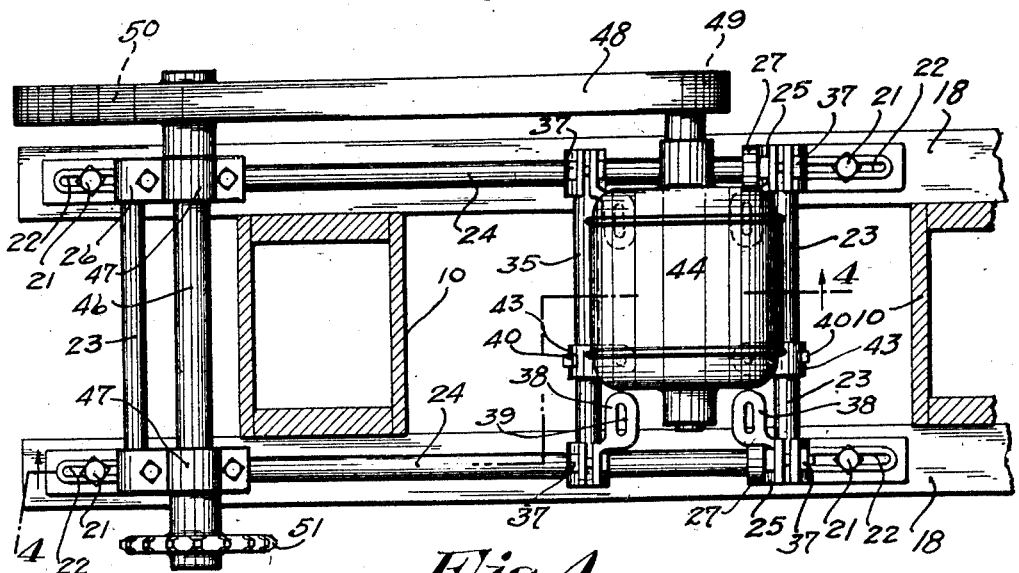
Fig. 2 is a view partly in plan and partly in section taken on the line 2—2 of Fig. 1, on an enlarged scale.

Of the parts of the elevator shown it is important to note the boot 8, boot shaft 9, legs 10, hopper 11, head 12, head shaft 13, distributing spout 14, lower floor or base 15 from which said elevator is supported independently of the house, and the numeral 16 indicates one of the floors of the house through which the legs 10 extend but are not in contact therewith or secured thereto whereby said floor structure is free to move in respect to said legs.

For the purpose of this case it is not thought necessary to illustrate the bucket-equipped elevator belt which runs over wheels on the boot shaft 9 and head shaft 13 with the upwardly travelling section of said belt in the left hand leg 10 and the downwardly moving section of said belt in the right leg 10.

Referring now in detail to the invention, the numeral 18 indicates a pair of sills, as shown in the form of angle bars, the vertical flanges of which are turned downward and rigidly bolted to the sides of the legs 10 above the floor 16 with said legs extending therebetween. In place of the angle sills 18, timbers of the desired dimensions may be used. Mounted on the sills 18 is a frame including a pair of front corner brackets 19 located between the legs 10 and a pair of rear corner brackets 20 located outward of the left-hand leg 10 in respect to Fig. 1. Each corner bracket 19—20 is rigidly secured to the horizontal flange of the respective sill 18 for adjustment longitudinally thereof by a nut-equipped bolt 21 which extends through a bore in said flange and a slot 22 in the base of said corner bracket.

Figure 4:
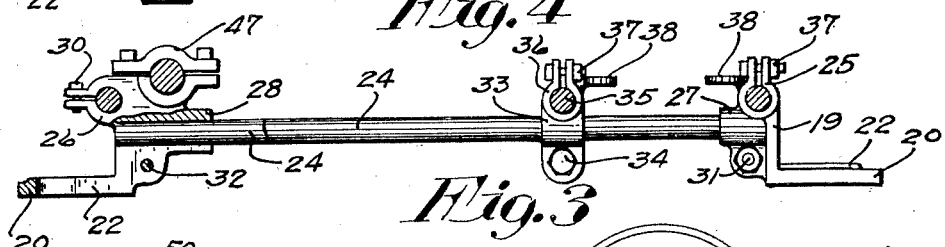
Fig. 4 is a detail view with some parts sectioned on the irregular line 4—4 of Fig. 2.
Figure 3:
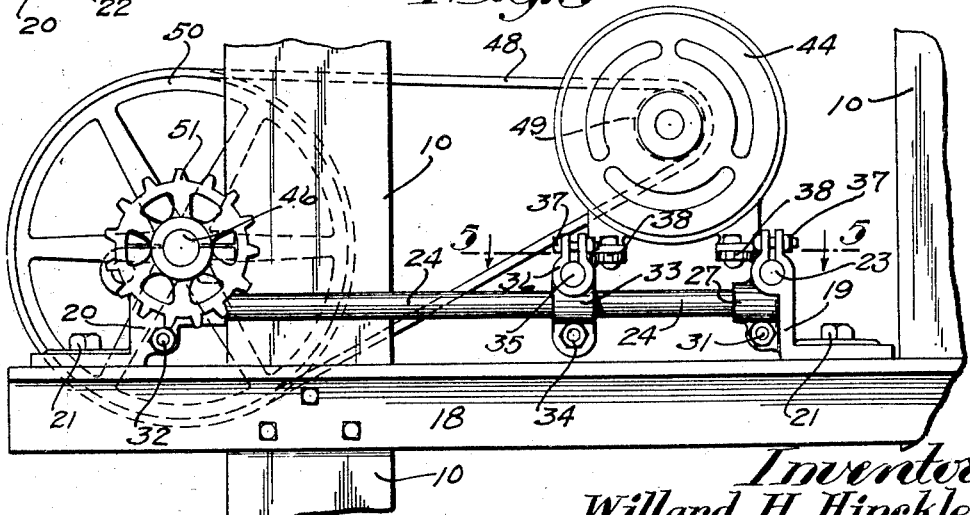
Fig. 3 is a side elevation of the parts shown in Fig. 2.

The corner brackets 19—20 of each pair are rigidly and adjustably connected by a transverse bar 23 and the corner brackets 19—20 on each sill 18 are rigidly and adjustably connected by a longitudinal bar 24 to complete the frame. The front and rear transverse bars 23 are mounted in couplings 25 and 26 in the corner brackets 19—20, respectively, and the longitudinal bars 24 are mounted in lower couplings 27 and 28 in the corner brackets 19—20, respectively. It will be noted that the couplings 25 and 26 are longitudinally split and connected by drawbolts 29 and 30, respectively, whereby said couplings may be frictionally clamped onto the transverse bars 23 and rigidly hold the same. The couplings 27 and 28 are also longitudinally split and connected by nut-equipped draw-bolts 31 and 32, respectively, to frictionally clamp said couplings onto the longitudinal bars 24 and rigidly hold the same. By reference to Figs. 4 and 6 it will be noted that the slits in the couplings 27 and 28 extend into the slots 22 to permit the contraction of said couplings.

A pair of intermediate coupling brackets 33 are slidably mounted on the longitudinal shaft 24 for longitudinal adjustment thereon. These coupling brackets 33 are longitudinally split and provided with drawbolts 34 for frictionally clamping said brackets onto the bars 24. Said coupling brackets 33 are rigidly connected by an intermediate transverse bar 35 in the plane of the bars 23 and adjustably mounted in longitudinally split couplings 36 equipped with nut-equipped draw-bolts 37 for frictionally clamping said couplings onto the intermediate transverse bar 35. Formed with each coupling 25 and 36 is a motor support 38 having a slot 39 which extends transversely of the sills 18.

Intermediate bearings 39 are slidably mounted on the front bar 23 and intermediate bar 35 for longitudinal adjustment thereon and held where set by set screws 40. These bearings 39 are rigidly connected by a tiebar 41 mounted therein below the front bar 23 and intermediate bar 35, see Fig. 7. Set screws 42 hold the tiebar 41 in the bearings 39. Formed with each bearing 39 at the top thereof is a motor support 43.

An electric motor 44 is mounted on the motor supports 43 and the two motor supports 38 at the wheel-equipped end of the motor 44 by means of nut-equipped bolts 45 pass through legs on the base of the motor and bars in the motor support 43 and the slots 29 in the respective motor support 38.

A countershaft 46 is journaled in bearings 47 on the rear corner brackets 20. This countershaft 46 is driven from the motor 44 by a silent chain 48 which runs over a relatively small wheel 49 on the shaft of the motor 44 and a relatively large wheel 50 on said countershaft. On the front end of the countershaft 46 outward of the respective sill 18 is a sprocket wheel 51. The head shaft 13 is driven from the countershaft 26 by a sprocket chain 52 which runs over the relatively small sprocket wheel 51 and a relatively large sprocket wheel 52 on the head shaft 13, and completes the driving connections from the motor 44 to said head shaft for operating the elevator belt.

The above described power and transmission unit is adjustable for application to elevator legs of different widths and spaced different distances apart and may be applied thereto at any desired elevation for driving either the boot shaft or the head shaft. After the width and spacing of a pair of elevator legs has been ascertained on which the unit is to be mounted, the sills and bar may be cut to proper length at the shop and the entire unit delivered knockdown to facilitate the packing, shipping and handling of the same. Said unit may be carried knockdown to the floor in the house from which the installation is to be made and then assembled on the sills after the same have been secured to the elevator legs, thus making the handling of the unit an extremely simple and easy matter.

The boot shaft or the head shaft may be driven from either end by mounting the motor 44 on either pair of motor supports 38 and the motor supports 43 and by turning the countershaft 46 so that the wheels 50 and 51 will come in their proper relation in respect to the motor 44. By adjusting the transverse bar 35 toward or from the front bar 23 and adjusting the bearings 39 on the front bar 23 and intermediate bar 35, the motor supports 38 and 43 may be adjusted to fit different sized motor bases in order that their anchoring bolts may be inserted through the bores in the supports 43 and the slots 39 in the supports 38. The slots 22 in the bases of the corner brackets 19—20 permit considerable adjustment of said brackets on the sills 18 in respect to each other and the adjustment of either one pair of said brackets will act as a tightener for the belt 48.

By assembling the power and transmission mechanism in a self-contained unit, the driving connections from the motor 44 to the countershaft 46 are always in proper alignment and by mounting this unit on the elevator legs 10, the driving connections from the countershaft 46 to either the boot shaft or the head shaft are always properly aligned and spaced and are not effected by the movement of the house under varying loads.

What I claim is:

1. A self-contained power and transmission unit having a frame comprising a pair of sills, front and rear pairs of corner brackets on the sills, a pair of transverse fixed bars and a pair of longitudinal fixed bars mounted in the corner brackets, said corner brackets being adjustable on the transverse bar to vary the distance between the sills a pair of coupling bearing brackets mounted on the longitudinal bars toward or from either pair of corner brackets, said front corner brackets and coupling brackets having motor supports, a motor mounted on certain of said supports, a countershaft journaled in the rear corner brackets, and driving connections from the motor to the countershaft.

2. The structure defined in claim 1 in further combination with additional motor supports mounted on the front and intermediate transverse bars for adjustment longitudinally thereof.

In testimony whereof I affix my signature.

WILLARD H. HINCKLEY.